July 12, 1966 J. DIAZ 3,261,014
COMBINED RADAR AND INFRARED DISPLAY SYSTEM
Filed March 27, 1961 3 Sheets-Sheet 1
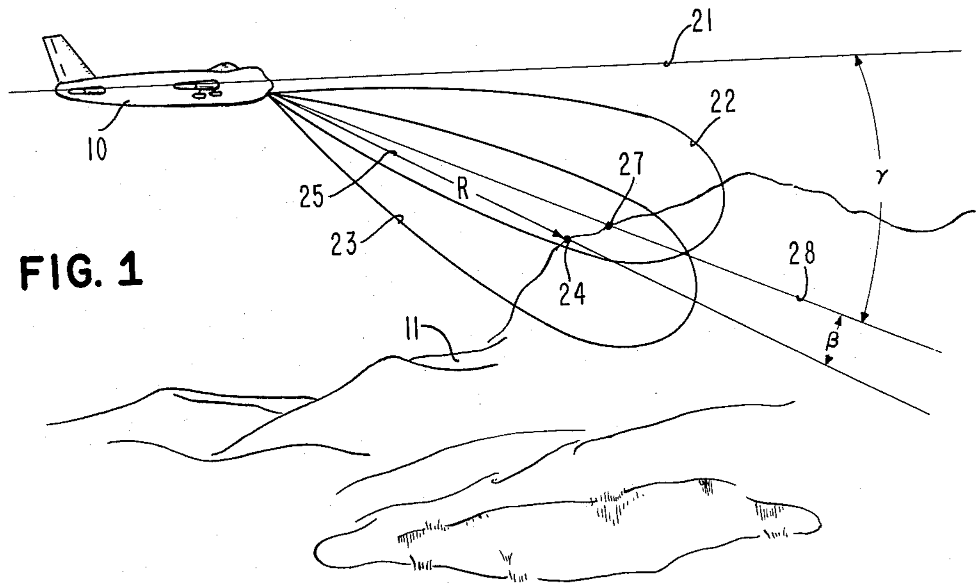
FIG. 1
FIG. 4
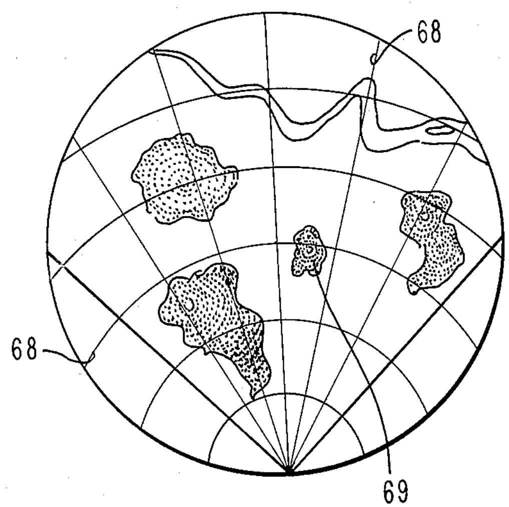
INVENTOR
JOE DIAZ
BY Paul D. Carmichael
ATTORNEY July 12, 1966 J. DIAZ 3,261,014

COMBINED RADAR AND INFRARED DISPLAY SYSTEM

Filed March 27, 1961 3 Sheets-Sheet 2

COMBINED RADAR AND INFRARED DISPLAY SYSTEM

Filed March 27, 1961

United States Patent Office 3,261,014
Patented July 12, 1966

1

3,261,014
COMBINED RADAR AND INFRARED DISPLAY SYSTEM

Joe Diaz, Johnson City, N.Y., assignor to International Business Machines Corporation, New York, N.Y., a corporation of New York Filed Mar. 27, 1961, Ser. No. 98,566
11 Claims. (Cl. 343—6)

The present invention relates generally to apparatus and methods for detecting and locating objects. More particularly, the invention is concerned with a system for correlating and recording various types of radiations emanating and reflected from an object to be located.

One of the best known systems for locating objects is radar, wherein area being searched is bombarded with microwave energy. The return or reflected signals are received by the radar system and presented on a suitable display device in a manner to provide the desired information concerning the area being searched. An object to be located is distinguished from its surroundings by its distinctive appearance on the display device or its "signature." The time interval required between transmission of the microwave energy and the receipt of the return signals determines the range or the distance to the object. The exact position of the located object may be found by the use of a directional radiation pattern. While radar systems are widely employed, the same are unable to locate an object in all instances. This is due to the fact that in many cases the return signals from the object cannot be distinguished from the reflected signals of surrounding objects. In other words, no readily identifiable target signature appears on the display device. For example, a metal object, such as a motor vehicle or a gun emplacement, located in a group of trees cannot be distinguished from the group of trees on the display device.

Another type of object detecting system is infrared, wherein the infrared radiations from an area being searched are gathered and presented on a suitable display device. The resultant display is a temperature picture of the area being searched. An object to be located can be distinguished from its surroundings by its distinctive temperature signature. The vehicle or gun emplacement in the above example would be easily distinguished from the trees with the use of an infrared system. Infrared systems are, in most instances, passive systems and, as such, are subject to the severe limitation that no ranging or distance information can be provided.

An infrared system located in an aircraft flying over terrain and directly downwardly and forwardly at a certain boresight angle will provide a temperature picture of an area along the flight path of and in front of the aircraft whereby an object can be detected. The infrared display will indicate the direction of the detected object but no information is available which allows the range or distance from the aircraft to the object to be determined. An approximation of range may be made by knowing the angle of depression, the altitude of the aircraft and assuming that the terrain being scanned is flat or planar. However, this assumption is not valid for most terrain and an observer looking at the infrared display does not know whether the detected object is one or ten miles from the aircraft. A radar system provides very accurate ranging information concerning a detected target. However, as previously explained, many targets cannot be detected from their surroundings by the use of a radar system. The solution to the limitations of infrared and radar object locating and detecting systems would appear to be the use of both with the observer looking at the two displays to obtain the necessary information about the detected object. The displays cannot be readily correlated in this manner since it is very difficult for the observer to say with certainty that a particular portion of the infrared display corresponds to a portion of the radar display. In addition, the observer is required to alternately watch two displays and this seriously affects his ability to interpret either of the displays with accuracy.

The invention is described in detail in connection with use on aircraft in the following portions of the specification. However, it should be understood at the outset, that the invention, in its broader aspects, is not limited to use on aircraft but may be used on the ground or an type of craft.

One type of radar system utilizes monopulse techniques to obtain a high data rate. The antenna apparatus is fixed in elevation and mechanically scanned in azimuth. A radar beam is transmitted and the incoming or return signals are simultaneously received on a pair of generally elliptical overlapping antenna patterns. The instantaneous sums and differences of the received signals are provided. These sums and differences are processed by suitable computing apparatus to obtain a burst of information corresponding to the depression angles of all objects within a preselected range increment for each azimuth position of the antenna apparatus. A very large area is scanned in a relatively short time period due to the electronic elevation scan and the electronic computation of the depression angle information.

Briefly, the present invention relates to an object detecting and locating system wherein information obtained from an infrared system is correlated with ranging information supplied by a monopulse radar system. A display device, such as a cathode ray tube has on coordinate deflection means energized in response to the azimuth position of the radar antenna apparatus and the infrared detector. The other coordinate deflection means of the display device is energized by a signal corresponding to ranging information as supplied from the monopulse radar system. The electron beam of the display device is modulated in accordance with video information received from the infrared detector. The infrared detector is scanned by an electronic beam in accordance with the depression angle information supplied by the monopulse radar system to provide the video information used to modulate the electron beam of the display device. The arrangement is such that an infrared or temperature picture of the area being observed which is highly accurate with respect to range appears on the display device. The distance or range to an object detected by the infrared system is immediately and directly available to the observer.

It is the primary or ultimate object of the present invention to provide a highly improved system for detecting and locating objects wherein information received from a first radiation system is very accurately correlated with information coming from a second radiation system. One of these systems is passive while the other is active. In a passage radiation system the natural radiations of an area being observed are detected while in an active radiation system the area is periodically bombarded with radiation and the reflected or return signals are observed. Each of the systems provides information which is not obtainable with or observable from the other system. The correlated or composite information detects and locates objects with a high degree of accuracy which could not be detected and/or located by either system alone.

Another object of the invention is to provide an object detecting and locating system wherein infrared information is correlated with information supplied by a high data rate radar system. The information is combined in such a manner that a resultant display can be provided which is a function of any desired variable. In the present instance the infrared information or temperature picture is presented as a function of azimuth and slant range. However, the same information may be presented as a function of azimuth and ground range, azimuth and elevation, etc.

Still another object of the invention is to provide a system for detecting and locating objects wherein infrared and radar information are combined to provide a display which covers a large area. Elevation scanning and computation of the depression angle information is done electronically in the monopulse radar system to provide a high data rate. An observer in an aircraft flying at a low altitude and a high speed is provided with a display representing a wide sector of scan whereby objects are detected and located in a wide corridor along the flight path of the aircraft.

A further object of the invention is to provide a system having the characteristics set forth above which is highly simplified in construction and operation and which does not affect in any manner the conventional use of the radar and infrared information. The radar information can also be separately displayed, if desired.

The foregoing and other objects, features and advantages of the invention will be apparent from the following more particular description of a preferred embodiment of the invention, as illustrated in the accompanying drawings.

In the drawings:

FIGURE 1 is a side elevational view of an aircraft flying over terrain with the overlapping antenna patterns of the monopulse radar system and certain other relationships indicated thereon;

FIGURE 4 is a front view looking at the display device and showing a corrected temperature or infrared picture of an area being observed as a function of azimuth and slant range.

Figure 2:
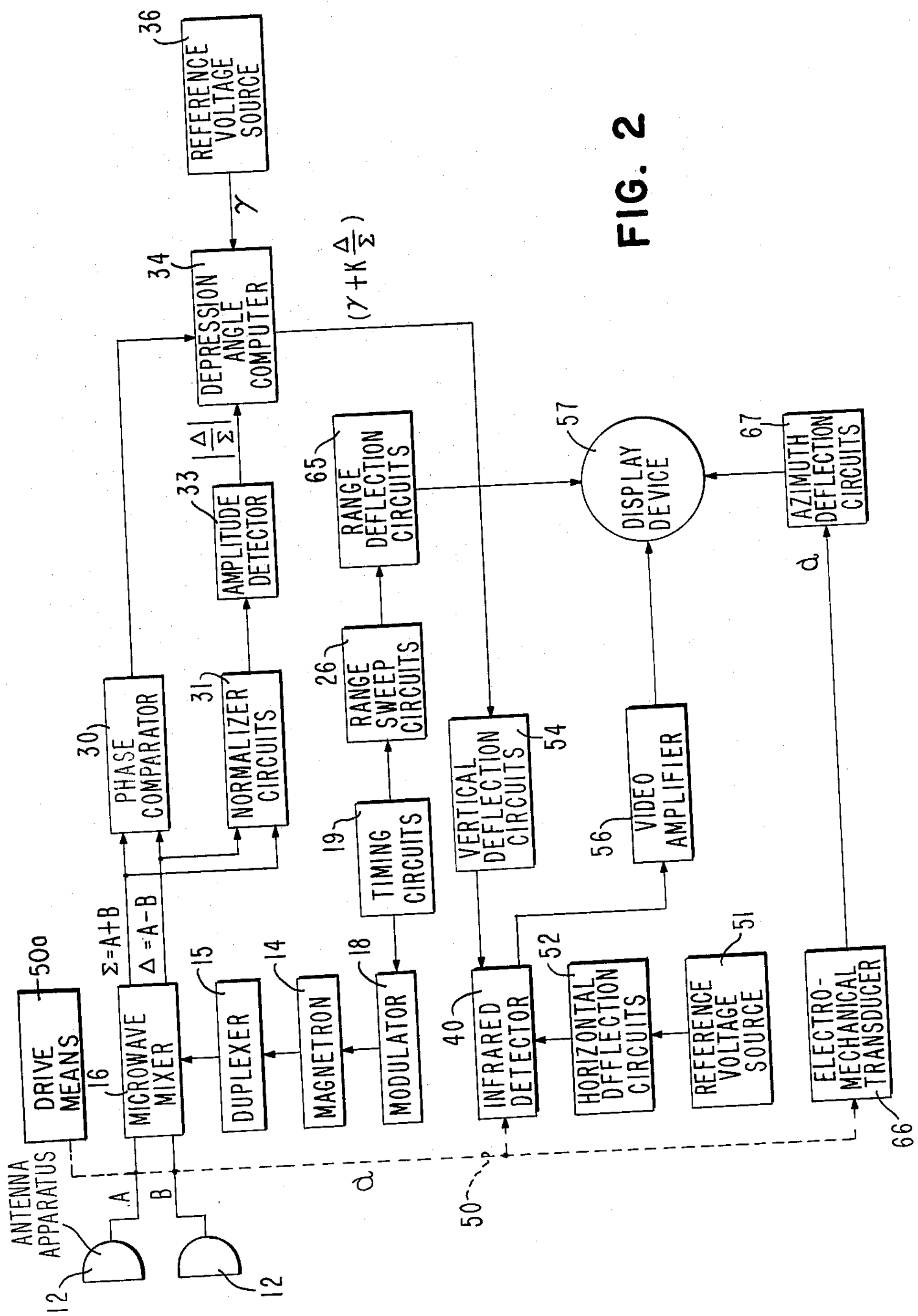
FIGURE 2 is a schematic block diagram of an object detecting and locating system constructed in accordance with the teachings of the present invention.
Figure 3:
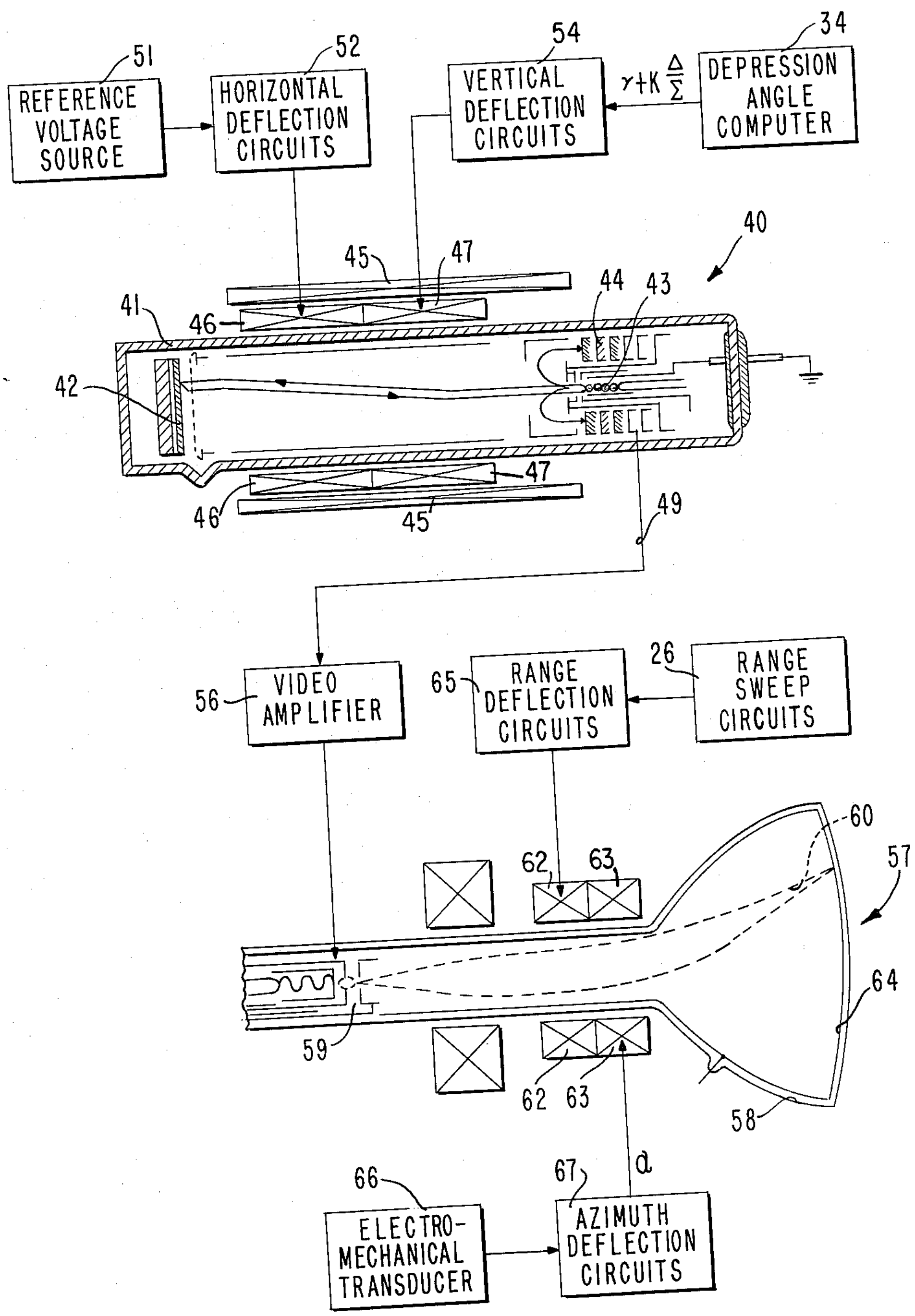
FIGURE 3 is a schematic side view of the display device and infrared detector employed in the object detecting and locating system.

Referring now to the drawings and initially to FIGURES 1–3 thereof, the reference numeral 10 designates an aircraft flying at a relatively low altitude with respect to the terrain 11. The aircraft 10 is provided with a radar system employing monopulse techniques for obtaining a high data rate of information concerning the terrain and objects thereon along and to both sides of the flight path of the aircraft. The aircraft is also provided with an infrared system which comprises an infrared detector adapted to gather the infrared radiations from the terrain and objects thereon. As will be further explained, the infrared and radar systems are operative to scan or examine the same portion of the terrain at the same time. The arrangement is such that both radar and infrared information is provided concerning each particle of the terrain 11 and each object located on the terrain within the range of these systems.

The radar system comprises a pair of feed horns or antennas 12 which are adapted to transmit microwave energy and receive reflected or return signals on directional antenna patterns. Microwave energy is supplied to the antennas 12 by a source of high frequency oscillations or magnetron 14 via a switch or duplexer 15 and a microwave mixer 16. The magnetron 14 is controlled by a modulator 18 in response to periodic signals generated by the timing circuits 19. The timing circuits are operative to generate timing pulses in a periodic manner to energize the modulator and magnetron whereby the antennas are supplied with periodic bursts of microwave energy. The frequency of transmission of the bursts of microwave energy by the radar system is known as the pulse repetition frequency (PRF rate).

The timing circuits 19 are employed to initiate the radar cycle and include circuits for the radar trigger, the range markers, the azimuth markers and other similar functions. Such circuits are shown and described on pages 54–152 of the book entitled "Principles of Radar," by Reintjes and Coate, and published in 1952 by the Maple Press, York, Pennsylvania. The modulator 18 may be of the general type disclosed on pages 153–214 of this book and is used to supply a burst of high power energy to the transmitter radio frequency power source. In this instance the power source comprises a magnetron 14 operative to generate signals in the microwave portion of the spectrum. The operation of the magnetron is described on pages 763–805 of the book "Principles of Radar."

The duplexer 15 is a device which may consist of a transmit-receive tube and a directional coupler which allows the antennas 12 to be used for transmitting and receiving by protecting the receiver during the times when bursts of microwave energy are transmitted. A conventional duplexer suitable for use in the present embodiment is shown on page 10 of the above-identified book "Principles of Radar."

The antennas 12 are so mounted with respect to the aircraft 10 that the periodic bursts of microwave energy or radar transmissions are directed downwardly toward the terrain 11 and any objects located thereon at a relatively small angle with respect to a horizontal plane 21 passing through the aircraft. The terrain and objects located thereon reflect the microwave energy and these return signals are received by the antennas 12 on a pair of vertically overlapped and generally elliptical receiving antenna patterns or lobes 22 and 23.

Microwave energy travels through the atmosphere at a constant rate or velocity ($3\times10^8$ meters per second) and by measuring the time interval between the transmission of the microwave energy and the receipt of the return or reflected signals from the terrain or an object a highly accurate indication of range is provided. The microwave energy travels in straight lines whereby the slant range between the aircraft and a reflecting particle of terrain or object is a linear function with respect to time. For example, the slant range to an object 24 on the terrain 11 with respect to the aircraft 10 is designated by the line 25 in FIGURE 1 of the drawings and is obtained by timing the interval between the transmission of a burst of a microwave energy and receipt of the reflected or return signals from this object. The pulses from the timing circuits 19 which actuate the modulator 18 and magnetron 14 also energize range sweep circuits 26. These latter circuits may be of the type described in section 4.6, pages 132–139, volume 22, entitled "Cathode Ray Tube Displays" of the Massachusetts Institute of Technology Radiation Laboratory Series for generating a linear ramp function or sawtooth waveform with respect to time. The output signals of the range sweep circuits are employed in a manner which will be hereinafter more fully described. It will be noted that the radar system is adapted to provide accurate ranging information concerning the terrain and objects located thereon.

The reflected signals from the terrain or an object located thereon are received on both of the antenna patterns 22 and 23 and these incoming signals are designated by the reference indicia A and B. An object 27 lying along a line 28 passing from the aircraft and through the common crossover point of the antenna patterns 22 and 23 will provide return or reflected signals of equal strength to the antennas 12. The angle between the line 28 and the horizontal reference plane 21 is known as the boresight angle and is commonly indicated by the reference character $\gamma$ in the art.

However, the object 24, which is not located on the line of boresight 28, will provide return signals of unequal strength to the antennas 12. The antenna associated with the pattern 23 will receive a stronger signal than the antenna associated with the receiving pattern 22. The angular displacement of any particle of terrain or object located thereon with respect to the line or axis of boresight 28 is referred to as the angle off boresight and the reference character $\beta$ is usually employed to designate this angle.

The return signals A and B received by the antennas 12 are processed by the microwave mixer 16 to provide sum ($\Sigma$) and difference ($\Delta$) signals. The sum and difference quantities are defined as follows:

(1) $$\Sigma=A+B$$

(2) $$\Delta=A-B$$

The microwave mixer 16 may comprise a hybrid T, a short slot coupler as exemplified by U.S. Patent No. 2,739,288 or any other microwave component capable of combining the A and B return signals in the manner set forth in Equations 1 and 2 above.

The angle off boresight for any particular particle of terrain or object located thereon can be obtained from the sum and difference signals in a manner set forth below:

(3) $$\beta=K\frac{\Delta}{\Sigma}$$

Where K is a constant of proportionality depending upon the design of the antenna apparatus.

It will be noted that the angle off boresight for any particular reflecting object or particle of terrain may be positive or negative depending upon whether the same is below or above the line of boresight 28. The angle off boresight is positive if a given reflecting object is above the line of boresight 28 and negative if the object is below this line. The depression angle information for any particular reflecting object can be obtained by adding the boresight angle ($\gamma$) to the angle off boresight ($\beta$) as set forth below:

(4) $$\text{depression angle}=\gamma+\beta$$

By substituting Equation 3 in Equation 4 the following relationship is obtained:

(5) $$\text{depression angle } \gamma+K\frac{\Delta}{\Sigma}$$

The sum and difference signals from the microwave mixer 16 are supplied to a phase comparator 30 and normalizer circuits 31 whose functions are to determine the phase relationships and the ratio of these signals. The phase comparator provides sign information (above or below the line of boresight 28) in the form of electrical signals while the normalizer circuits effectively divide the difference signal by the sum signal. Variations in the strengths of the incoming signals due to differences in range and the reflective properties of objects are minimized by normalizer circuits 31. The construction and operation of the phase comparator and normalizer circuits is more fully described on pages 49–56 of a book entitled "Introduction to Monopulse," by Donald R. Rhodes, which was published in 1959 by McGraw-Hill Book Company, Inc., New York, New York.

The output of the normalizer circuits 31 is supplied to an amplitude detector 33 that provides an electrical signal which varies in accordance with the maximum amplitude of the input supplied thereto. The output of the amplitude detector is essentially a voltage signal which varies in accordance with the ratio of the sum and difference signals while the sign information pertaining thereto is provided by the output of the phase comparator 30. The amplitude detector may comprise an integrating circuit of the general type shown and described on pages 503–507 of volume 19 of the above-identified Massachusetts Institute of Technology Radiation Laboratory Series.

A depression angle computer 34 is adapted to perform the mathematical manipulations set forth in Equation 5 above. The ratio of the sum and difference signals and the sign information associated therewith are supplied by the amplitude detector 33 and the phase comparator 30. An electrical signal corresponding to the fixed boresight angle $\gamma$ is provided to the depression angle computer from a reference signal generator 36 which may comprise an adjustable potentiometer connected across a source of direct current voltage. The computer is of any desired construction capable of correlating the various inputs thereto in the desired manner.

Each burst of output signals from the depression angle computer 34 will contain depression angle information corresponding to each reflecting object along a certain azimuth line and within a selected range increment. The antennas 12 are fixed in elevation and scanned mechanically in azimuth by appropriate drive and circuit means indicated by the broken line 50 and block 50*a*. Thus, the antennas 12 will be at a particular azimuth position or angle ($\alpha$) for each transmission of microwave energy and reception of the return signals associated therewith. The scanning in elevation, as well as the computation of the depression angle elevation by computer 34, is accomplished electronically in that each reflecting object or particle of terrain along a vertical line determined by the azimuth position of the antennas generates return or incoming signals for a single transmission of microwave energy. It is thus possible to scan a large area in azimuth on both sides of the line of flight.

For those desiring a more detailed explanation of the theory of monopulse radar and apparatus for accomplishing the above, reference should be made to pages 5–10, 33–59, 65–68 and 92–96 of the above-identified book entitled "Introduction to Monopulse" and particularly to the Class I system described therein. It should be understood that no claim is being made to the general concepts of employing monopulse techniques to obtain a high data rate of information other than as is embodied in the combinations hereinafter set forth.

The radar system supplies information concerning the position of and range to the terrain and objects located thereon. This information can be presented in any desired form on a display device as is conventional in the art. However, it is often impossible to distinguish objects from surrounding terrain features or other objects having similar reflective characteristics. Ranging information is available providing, of course, that the object of interest can be detected and recognized by the observer.

The infrared system comprises an infrared detector 40 which is shown in some detail in FIGURE 3 of the drawings and is of the type described in an article entitled "An Infrared Pickup Tube" appearing on pages 1607–1609, volume 47, No. 9, "Proceedings of the IRE." The infrared detector includes an elongated generally cylindrical tube 41 having a target assembly 42 and an electron gun 43 at the opposite ends thereof. The target assembly 42 comprises material which is sensitive to infrared radiation, such as modified lead sulphide, for example, whereby infrared information may be recorded thereon. The electron gun 43 is adapted to produce a low velocity beam of electrons which are directed toward the target assembly 42. Electrons returned from the target assembly are collected by a secondary emission multiplier 44 which is disposed in axial relation with respect to the electron gun. The electron beam is focused by suitable focusing coils 45 connected to a source of direct current voltage, not shown. The pickup tube is also provided with horizontal and vertical deflection means which may take the form of the deflection coils 46 and 47. The arrangement is such that the target assembly 42 can be scanned by the electron beam in accordance with the signals supplied to the deflection coils 46 and 47 to produce an output signal on conductor 49 leading from the secondary emission multiplier 44 corresponding to the infrared radiations or information sensed by the target assembly.

The infrared detector 40 is mounted in the aircraft whereby the target assembly receives the infrared radiations from the same area which is being examined by the radar system at any particular instant in time. This is accomplished by correlating the line of boresight 28 of the radar system with the center axis of the infrared detector 40 and moving the infrared detector in azimuth in accordance with the azimuth movements of the antennas. The movement of the infrared detector 40 in azimuth is synchronized with the movement of the antennas 12 by suitable drive means and control circuits represented by the broken line 50 and block 50*a* or, alternatively, by mounting the infrared detector directly on the antennas.

The infrared system is a passive system in that the same does not periodically transmit radiation toward the area being observed but rather only gathers or senses infrared radiation emanating from the area being examined. The infrared information is always available on the target assembly 42 and is not dependent upon periodically transmitted and reflected signals. The temperature or infrared information provides a means for detecting and distinguishing objects which are not readily detected by a radar system although no indication or data as to the range of the detected object is provided. It is impossible to tell whether an object appearing on the target assembly 42 is directly in front of the aircraft or a great distance away due to variations in the contours of the terrain. This situation exists even if the area being observed is continuously illuminated with a source of infrared radiation as is employed in certain infrared systems.

The horizontal deflection coils 46 of the infrared detector 40 are connected with a source of reference voltage 51 through horizontal deflection circuits 52. The reference voltage source 51 is operative to lock the electron beam in a given horizontal position. This horizontal position corresponds exactly to the vertical line of terrain and objects thereon which are being examined or scanned by the radar system at any particular instant in time. The electron beam may move vertically along the horizontal position in a manner to be more fully described whereby the same is adapted to scan only that portion of the target assembly 42 which contains infrared information corresponding to the vertical line scanned by the radar system. In the present embodiment the infrared detector is moved mechanically in azimuth with the antennas 12 and the electron beam is maintained in a predetermined horizontal position. It is possible to maintain the infrared detector in fixed relation with respect to the radar system and energize the horizontal deflection coils of the detector in accordance with the azimuth movement of the antennas providing, of course, the infrared detector is operative to examine the entire sector scanned by the radar system from one stationary position.

The output signals from the depression angle computer 34 are passed through vertical deflection circuits 54 and energize the vertical deflection coils 47 of the infrared detector. The electron beam will move along a vertical line on the target assembly 42 in response to and in a manner dependent upon the depression angle information supplied by the radar system. Thus, as the radar return signals corresponding to a particular point of or object on the terrain are being processed by the radar system, the electron beam of the infrared detector is directed to the area of the target assembly 42 which contains the corresponding infrared information and the output on conductor 49 varies in accordance with the infrared radiations emanating from this particular point or object. The infrared and radar systems are correlated in that the infrared and radar information pertaining to any particular object is available and processed at the same instant in time.

The output signals from the infrared detector are passed to a video amplifier 56 and then to a display device 57. The display device comprises a cathode ray tube 58 and the signals containing infrared information coming from the infrared detector 40 are supplied to grid circuits 59 of the cathode ray tube. The arrangement is such that the electron beam 60 of the cathode ray tube 58 is intensity modulated in accordance with the infrared information coming from the infrared detector 40. The video amplifier is of the general type shown and described on pages 145–159, volume 22, of the above-identified Massachusetts Institute of Technology Radiation Laboratory Series.

The display device also comprises deflection means, such as vertical and horizontal deflection coils 62 and 63, for positioning the electron beam 60 on a fluorescent screen 64. The vertical deflection coils 62 are energized by the linear function generated by the range sweep circuits 26 and corresponding to radar ranging information. The output signals of the sweep circuits 26 are passed through range deflection circuits 65 whereby the electron beam 60 moves vertically at a linear rate which is a direct function of range. As previously explained, the range sweep circuits 26 are operative to begin generating a linear voltage function each time the timing circuits 19 produce a timing pulse for triggering the modulator 18 and the magnetron 14.

The other coordinate deflection coils 63 of the cathode ray tube 58 are energized in accordance with the azimuth position of the antennas 12. This is accomplished by means of an electro-mechanical transducer 66 which is associated with the antennas and provides an output signal corresponding to the azimuth line of terrain and objects located thereon being examined at any particular instant of time by the radar and infrared systems. The output from the transducer 66, which may comprise a resolver as described in RICO Handbook No. 57, entitled "Resolver Handbook," which was published in 1954 by Reeves Instrument Corporation, 215 East 91st Street, New York 28, New York, is passed to azimuth deflection circuits 67.

The inputs to the cathode ray tube 58 are such that the electron beam 60 will be moved across the fluorescent screen 64 as a function of range and azimuth while the electron beam is intensity modulated by the infrared information coming from the infrared detector 40. This type of display is known in the art as an off center plan-position-indicator (PPI) sector display. A more complete description of such a display is found on pages 425–445, volume 22, of the Massachusetts Institute of Technology Radiation Laboratory Series.

Referring now to FIGURE 4 of the drawings, there is shown the face of the cathode ray tube 58. The resultant presentation is a highly defined and sharp temperature or infrared picture of the area being observed which is accurate with respect to range. Reference lines 68 indicating range increments and azimuth angles may be etched or otherwise provided on the face of the cathode ray tube. For example, the area 69 on the face of the display device represents the object 24 and is easily distinguished with respect to its surroundings. A similar radar presentation would not allow the detection of this object. The observer can quickly determine the distance and direction to the object 24 since the infrared information has been accurately corrected with respect to range. The appropriate area of the target assembly 42 of the infrared detector is scanned in accordance with the depression angle information coming from the computer 34.

In the illustrated embodiment of the invention the display device presents the infrared information as a function of range and azimuth. Other types of display may be employed. Since the radar system povides ranging information the elevation can be computed in the manner set forth in co-pending U.S. patent application Serial No. 77,453, now Patent No. 3,212,088, entitled "Radar Display System," which is assigned to the assignee of the present invention. The vertical deflection circuits of the infrared detector would be energized in accordance with this elevation information and the resultant display would provide a temperature picture as a function of azimuth and elevation. Alternatively, the temperature information may be present as a function of azimuth and ground range. It should be apparent that any of a wide variety of display methods may be employed as is best adapted for a given use.

The infrared detector is shown to comprise a target assembly which covers a large area. When the infrared detector is moved in azimuth with the antennas, the horizontal deflection coils are tied to a reference potential whereby the electron beam is limited to movement along a vertical line. A detector can be designed which has a vertically elongated and extremely thin target area that corresponds to the vertical line being examined by the radar system at any particular instant of time.

It should now be apparent that the objects initially set forth have been accomplished. An object detecting and locating system has been provided which is capable of presenting a range corrected infrared or temperature picture over a wide sector of scan.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An object detecting and locating system for providing range corrected temperature information concerning an area being examined comprising a radar system and an infrared system, said radar system having antenna apparatus fixed in elevation, means to move said antenna apparatus in azimuth, transmitting and receiving apparatus connected with said antenna apparatus for sending out and receiving pulses of microwave energy, said antenna apparatus defining a pair of antenna patterns for receiving the return signals from said area being examined, computing means for processing said return signals and providing a burst of signals corresponding to the depression angles of the reflecting objects for each azimuth position of said antenna apparatus, range sweep circuits generating a linear range signal for each transmitted pulse of said microwave energy, said infrared system having an infrared target assembly for sensing infrared information, means for moving said infrared target assembly with said antenna apparatus, an electron gun providing an electron beam for scanning said infrared target assembly, coordinate deflection means for said electron beam, means energizing one of said coordinate deflection means in response to said burst of signals from said computing means, reference voltage means for energizing the other of said coordinate deflection means, output means for said infrared system providing signals representing the infrared information on said target assembly scanned by said electron beam, a display device having a pair of deflection means and an electron beam, means to modulate said electron beam of said display device in respone to said signals from said output means, one of said deflection means of said display device being energized in response to the signals from said range sweep circuits, and the other of said deflection means of said display device being energized in response to the azimuth position of said antenna apparatus and said target assembly.

2. An object detecting and locating system for providing range corrected temperature information concerning an area being examined comprising a radar system and an infrared system, said radar system having antenna apparatus fixed in elevation, means to move said antenna apparatus in azimuth, transmitting and receiving apparatus connected with said antenna apparatus for sending out and receiving pulses of microwave energy, said antenna apparatus defining a pair of antenna patterns for receiving the return signals, computing means for processing said return signals and providing a burst of signals corresponding to the depression angles of the reflecting objects for each azimuth position of said antenna apparatus, range sweep means generating range signals for each transmitted pulse of said microwave energy, said infrared system having a target assembly for sensing infrared radiations, means mounting said target assembly to receive infrared radiations from said area being examined, means to scan said target assembly, means to actuate said means to scan in response to the bursts of signal from said computing means, said means to scan providing an output signal corresponding to infrared information, a display device having a pair of deflection means and an electron beam, means to modulate said electron beam in response to said output signal from said means to scan, one of said deflection means being energized by said range signals, and the other of said deflection means being energized in accordance with the azimuth position of said antenna apparatus of said radar system.

3. An object detecting and locating system for correlating temperature and radar information concerning an area being examined comprising a radar system and an infrared system, said radar system having antenna apparatus fixed in one direction, means to move said antenna apparatus in a second direction, transmitting and receiving apparatus connected with said antenna apparatus for sending out and receiving pulses of microwave energy, said antenna apparatus defining a pair of antenna patterns for receiving the return signals, computing means for processing said return signals and providing a burst of signals corresponding to information concerning the deflecting objects for each position of said antenna apparatus in said second direction, said infrared system having a target assembly, means mounting said target assembly to receive infrared radiations from said area being examined, means to scan said target assembly, means to actuate said means to scan in response to the bursts of signals from said computing means, and said means to scan providing an output signal containing radar correlated infrared information concerning said area being examined.

4. An object detecting and locating system for correlating radar and infrared information concerning an area being examined comprising a radar system and an infrared system, said radar system having antenna apparatus, transmitting and receiving apparatus connected with said antenna apparatus for sending out and receiving pulses of microwave energy, computing means for processing the received signals and providing a burst of signals corresponding to information concerning the reflecting objects in said area being examined, said infrared system having a target assembly sensitive to infrared radiations from said area being examined, means to scan said target assembly, means to actuate said means to scan in response to the bursts of signals from said computing means, and said means to scan providing an output signal containing radar correlated infrared information concerning said area being examined.

5. Apparatus according to claim 4 further characterized in that said means to scan comprises a pair of deflection means, said means to actuate comprising one of said deflection means, a source of reference potential, and means to energize the other of said deflection means with said reference potential.

6. Apparatus according to claim 4 further comprising a display device, said display device having an electron beam, and means to modulate said electron beam in response to said output signal from said means to scan.

7. Apparatus according to claim 6 further characterized in that said display device has deffection means, means to move said antenna apparatus, and means to energize said deflection means in response to movement of said antenna apparatus.

8. An object detecting and locating system comprising an active radiation sensitive system and a passive radiation sensitive system, said active system having transmitting and receiving apparatus for sending out signals and receiving reflected return signals of radiation, computing means for processing the return signals and providing signals containing information concerning the positional relationship between said transmitting and receiving apparatus and the reflecting objects in an area being examined, said passive system having a radiation receiving means sensitive to radiations from the same area being examined, a display device, and means responsive to the radiation from said radiation receiving means and said computing means to display on said display device the radiations received by said radiation receiving means as a function of the positional relationship information from said computing means.

9. Apparatus according to claim 8 further characterized in the display device having an electron beam, said means to display including means to deflect said electron beam in accordance with the positional relationship information from said computing means, and means to modulate said electron beam in response to radiations received by said radiation receiving means.

10. An object detecting and locating system comprising first and second radiation sensitive systems, said first system having transmitting and receiving apparatus for sending out signals and receiving reflected return signals of radiation, computing means for processing the return signals and providing signals containing information concerning the positional relationship between said transmitting and receiving apparatus and the reflecting objects in an area being examined, said second system having receiving means sensitive to radiations from said area being examined, means to interrogate said last-mentioned receiving means to provide information signals indicative of the instantaneous radiation sensing condition of the receiving means, means to actuate said means to interrogate under control of said signals from said computing means so that the interrogation of said receiving means is a function of the information contained in said return signals, and means for displaying the information signals provided from said means to interrogate.

11. An object detecting and locating system comprising first and second radiation sensitive systems, said first system having receiving means for receiving radiation signals from an area being examined, computing means for processing said signals and providing signals containing information concerning the objects in said area being examined, said second system having receiving means sensitive to radiations from said area being examined, means to interrogate said last-mentioned receiving means, means to actuate said means to interrogate in response to said signals from said computing means, said second system comprising a target assembly sensitive to infrared radiations, said means to interrogate comprising scanning means, and said scanning means providing output signals containing infrared information which has been correlated with information coming from said first system.

References Cited by the Examiner

UNITED STATES PATENTS

| | | | |
|---|---|---|---|
| 2,842,760 | 7/1958 | McLucas | 343—6 |
| 2,895,127 | 7/1959 | Padgett | 343—7 |
| 3,053,932 | 9/1962 | Worst | 343—6 X |

LEWIS H. MYERS, *Primary Examiner.*

MALCOLM A. MORRISON, CHESTER L. JUSTUS, *Examiners.*

P. M. HINDERSTEIN, E. T. CHUNG, *Assistant Examiners.*